US012531170B2

(12) United States Patent
Mutnury et al.

(10) Patent No.: US 12,531,170 B2
(45) Date of Patent: Jan. 20, 2026

(54) TWIN-AXIAL CABLE INCLUDING WEDGES

(71) Applicant: Dell Products L.P., Round Rock, TX (US)

(72) Inventors: Bhyrav M. Mutnury, Round Rock, TX (US); Raymond Dewine Heistand, II, Round Rock, TX (US); Sandor Tibor Farkas, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 124 days.

(21) Appl. No.: 18/418,730

(22) Filed: Jan. 22, 2024

(65) Prior Publication Data

US 2025/0239384 A1 Jul. 24, 2025

(51) Int. Cl.

| | |
|---|---|
| ***H01B 7/18*** | (2006.01) |
| ***H01B 7/08*** | (2006.01) |
| ***H01B 11/00*** | (2006.01) |

(52) U.S. Cl.

CPC ......... *H01B 7/1895* (2013.01); *H01B 7/0807* (2013.01); *H01B 7/0861* (2013.01); *H01B 11/002* (2013.01)

(58) Field of Classification Search

CPC ... H01B 7/0807; H01B 7/0861; H01B 7/1895

See application file for complete search history.

(56) References Cited

U.S. PATENT DOCUMENTS

| | | | | |
|---|---|---|---|---|
| 11,482,349 | B1 * | 10/2022 | Lee | H01B 7/0009 |
| 2012/0267159 | A1 * | 10/2012 | Gundel | H01B 7/0861 174/350 |
| 2015/0270872 | A1 * | 9/2015 | Zhang | H04B 3/32 375/257 |

FOREIGN PATENT DOCUMENTS

| | | |
|---|---|---|
| JP | 2004-087198 | * 3/2004 |

* cited by examiner

*Primary Examiner* — Chau N Nguyen

(74) *Attorney, Agent, or Firm* — McDermott Will & Schulte LLP

(57) ABSTRACT

A twin-axial cable including a first conductor; a first dielectric material surrounding the first conductor; a second conductor; a second dielectric material surrounding the second conductor; a first wedge; a second wedge positioned opposite to the first wedge; and a conductive shield surrounding the first conductor, the first dielectric material, the second conductor, the second dielectric material, the first wedge, and the second wedge, wherein at least a portion of the first wedge is positioned between the first dielectric material and the second dielectric material at a first region of the twin-axial cable, wherein at least a portion of the second wedge is positioned between the first dielectric material and the second dielectric material at a second region of the twin-axial cable opposite to the first region of the twin-axial cable.

10 Claims, 11 Drawing Sheets

TWIN-AXIAL CABLE INCLUDING WEDGES

BACKGROUND

Field of the Disclosure

The disclosure relates generally to a twin-axial cable including wedges.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Cables have become an integral part of information handling systems, include servers. Within a rack, across multiple racks, and across multiple servers (within a rack), communication is accomplished through cables. The cables can further connect one or more PCBs. Cables provide a lower loss mode for signal propagation compared to PCBs.

SUMMARY

Innovative aspects of the subject matter described in this specification may be embodied in a twin-axial cable including a first conductor; a first dielectric material surrounding the first conductor; a second conductor; a second dielectric material surrounding the second conductor; a first wedge; a second wedge positioned opposite to the first wedge; and a conductive shield surrounding the first conductor, the first dielectric material, the second conductor, the second dielectric material, the first wedge, and the second wedge, wherein at least a portion of the first wedge is positioned between the first dielectric material and the second dielectric material at a first region of the twin-axial cable, wherein at least a portion of the second wedge is positioned between the first dielectric material and the second dielectric material at a second region of the twin-axial cable opposite to the first region of the twin-axial cable.

Other embodiments of these aspects include corresponding systems and apparatus.

These and other embodiments may each optionally include one or more of the following features. For instance, when the twin-axial cable is in a first state, the first wedge is spaced-apart from the second wedge a first distance. When the first wedge is spaced-apart from the second wedge the first distance: an outer surface of the first dielectric material is spaced-apart from an outer surface of the first conductor a second distance, wherein the second distance is substantially constant between the outer surface of the dielectric material and the outer surface of the first conductor; an outer surface of the second dielectric material is spaced-apart from an outer surface of the second conductor the second distance, wherein the second distance is substantially constant between the outer surface of the dielectric material and the outer surface of the first conductor; and the outer surface of the first conductor is spaced-apart from the outer surface of the second conductor a third distance, wherein a first impedance of the twin-axial cable is based on the second distance and the third distance. When the twin-axial cable is in a second state, the first wedge is spaced-apart from the second wedge a fourth distance, the fourth distance less than the first distance. When the first wedge is spaced-apart from the second wedge the fourth distance: the outer surface of the first dielectric material is spaced-apart from the outer surface of the first conductor a fifth distance at a first and a second location of the first dielectric material, the first location opposite to the second location, the fifth distance less than the second distance; the outer surface of the second dielectric material is spaced-apart from the outer surface of the second conductor the fifth distance at a third and a fourth location of the first dielectric material, the third location opposite to the fourth location; and the outer surface of the first dielectric material is spaced-apart from the outer surface of the second dielectric material a sixth distance, wherein the sixth distance is greater than the third distance, wherein a second impedance of the twin-axial cable is based on the fifth distance and the sixth distance. The first impedance is substantially the same as the second impedance. The first wedge and the second wedge are conductive. The first wedge is conductive, and the second wedge is non-conductive. The first wedge and the second wedge are equilateral triangles.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
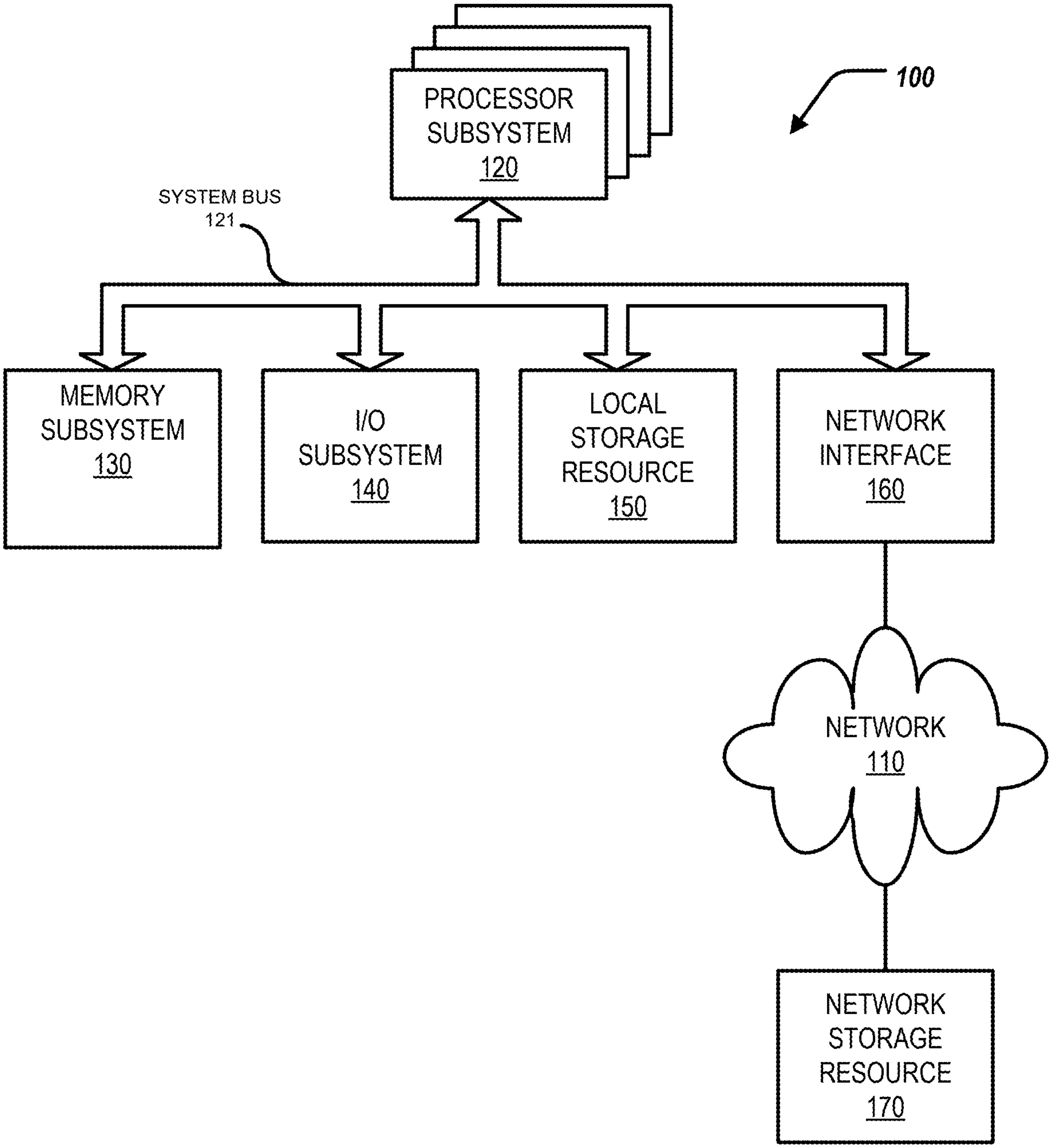
FIG. 1 is a block diagram of selected elements of an embodiment of an information handling system.

This disclosure discusses a twin-axial cable of an information handling system. In short, the twin-axial cable can be bent such that a conductive shield of the twin-axial cable compresses dielectric material surrounding conductors of the twin-axial cable. To compensate for an impedance drop of the twin-axial cable when the conductive shield compresses the twin-axial cable, concurrently when the conductive shield compresses the dielectric material, the conductive shield forces wedges of the twin-axial cable together to decrease the gap therebetween. When the distance between the wedges is decreased, the distance between the conductors is increased. When the distance between the conductors is increased, the impedance of the twin-axial cable is increased, compensating for the drop in impedance when the conductive shield compresses the twin-axial cable, described further herein.

Specifically, this disclosure discusses a twin-axial cable including a first conductor; a first dielectric material surrounding the first conductor; a second conductor; a second dielectric material surrounding the second conductor; a first wedge; a second wedge positioned opposite to the first wedge; and a conductive shield surrounding the first conductor, the first dielectric material, the second conductor, the second dielectric material, the first wedge, and the second wedge, wherein at least a portion of the first wedge is positioned between the first dielectric material and the second dielectric material at a first region of the twin-axial cable, wherein at least a portion of the second wedge is positioned between the first dielectric material and the second dielectric material at a second region of the twin-axial cable opposite to the first region of the twin-axial cable.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-9 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
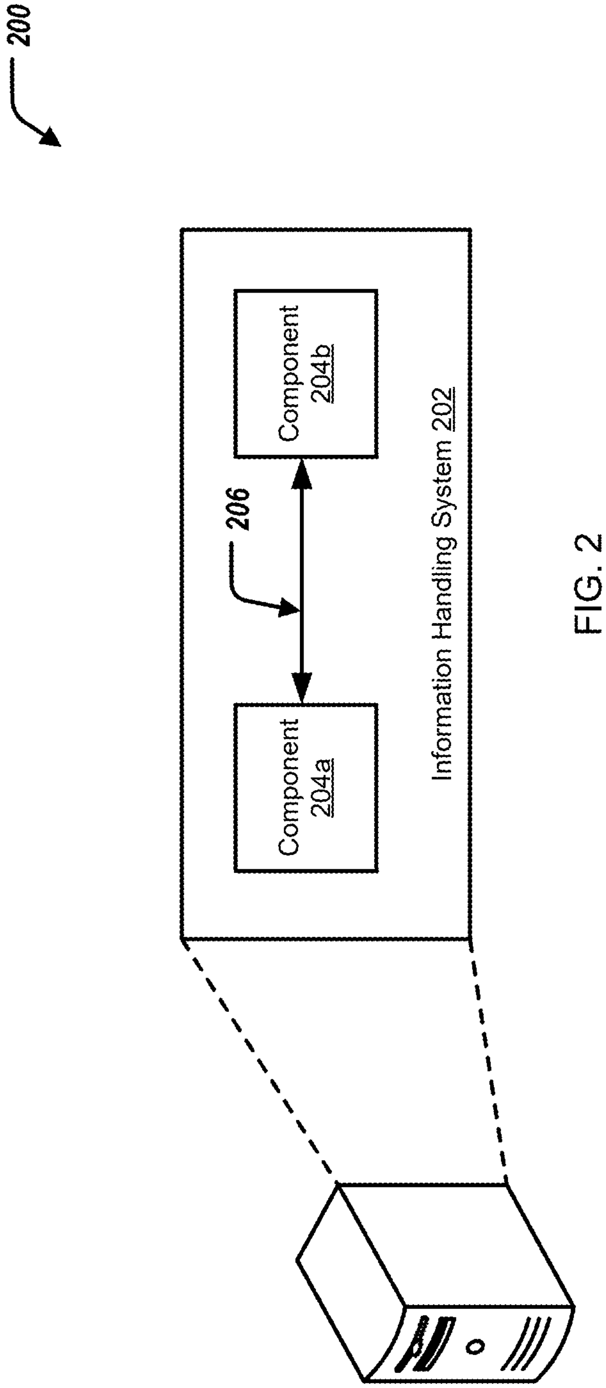
FIG. 2 illustrates a block diagram of the information handling system including a twin-axial cable.

Turning to FIG. 2, FIG. 2 illustrates an environment 200 including an information handling system 202. The information handling system 202 can include computing components 204*a*, 204*b* (collectively referred to as computing components 204) and a twin-axial cable 206. In some examples, the information handling system 202 is similar to, or includes, the information handling system 100 of FIG. 1. In some examples, the computing components 204 may include a processor, a volatile memory medium, a nonvolatile memory medium, an I/O subsystem, a network interface, a PCB, and an expansion card (e.g., a host bus adapter, a video card, a network adapter card, etc.), among others. The twin-axial cable 206 can communicatively couple the computing component 204*a* to the computing component 204*b*.

Figure 3:
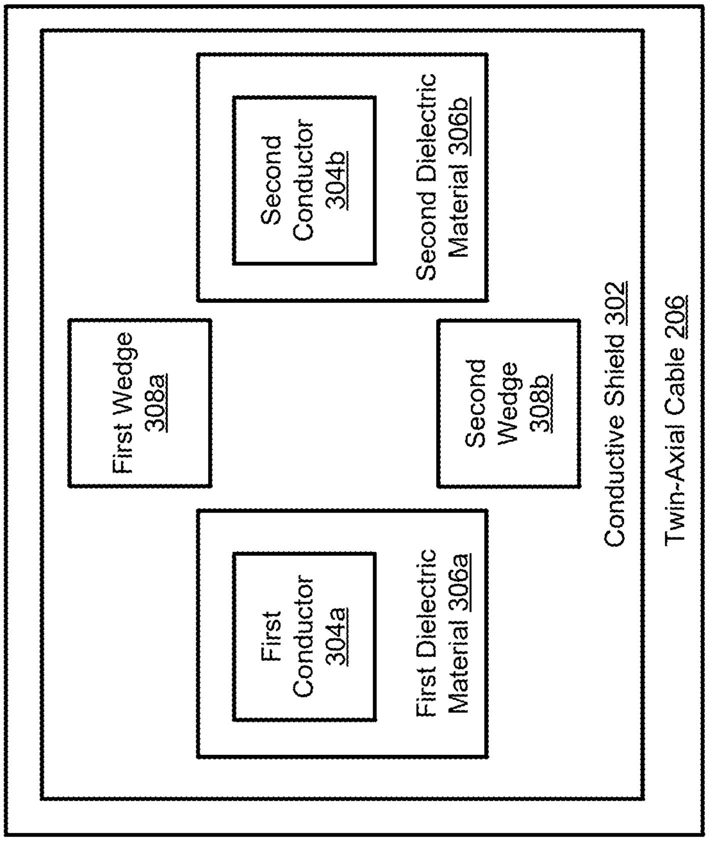
FIG. 3 illustrates a block diagram of the twin-axial cable.

FIG. 3 illustrates a block diagram of the twin-axial cable 206. The twin-axial cable 206 can include a conductive shield 302, a first conductor 304*a*, a second conductor 304*b*, a first dielectric material 306*a*, a second dielectric material 306*b*, a first wedge 308*a*, and a second wedge 308*b*. The first conductor 304*a* and the second conductor 304*b* can collectively be referred to as conductors 304; the first dielectric material 306*a* and the second dielectric material 306*b* can collectively be referred to as dielectric material 306; and the first wedge 308*a* and the second wedge 308*b* can collectively be referred to as wedges 308.

In short, the twin-axial cable 206 can be bent such that the conductive shield 302 compresses the dielectric material 306. To compensate for an impedance drop of the twin-axial cable 206 when the conductive shield 302 compresses the twin-axial cable 206, concurrently when the conductive shield 302 compresses the dielectric material 306, the conductive shield 302 forces the wedges 308 together to decrease the gap therebetween. When the distance between the wedges 308 is decreased, the distance between the conductors 304 is increased. When the distance between the conductors 304 is increased, the impedance of the twin-axial cable 206 is increased, compensating for the drop in impedance when the conductive shield 302 compresses the twin-axial cable 206, described further herein.

Figure 4A:
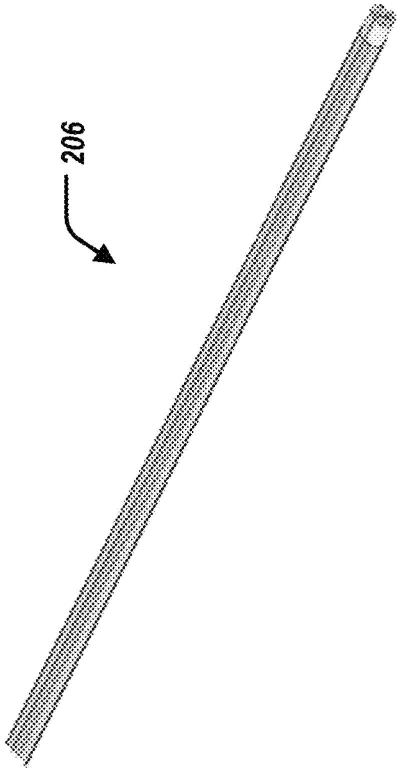
FIG. 4A illustrates a perspective view of the twin-axial cable, in a first state.
Figure 4B:
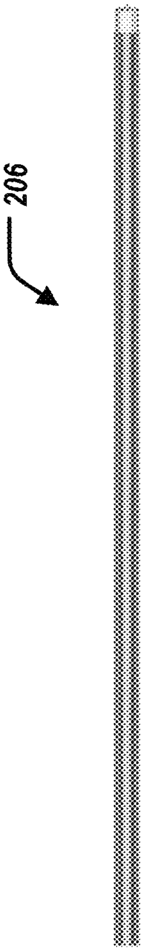
FIG. 4B illustrates a side view of the twin-axial cable, in the first state.
Figure 5:
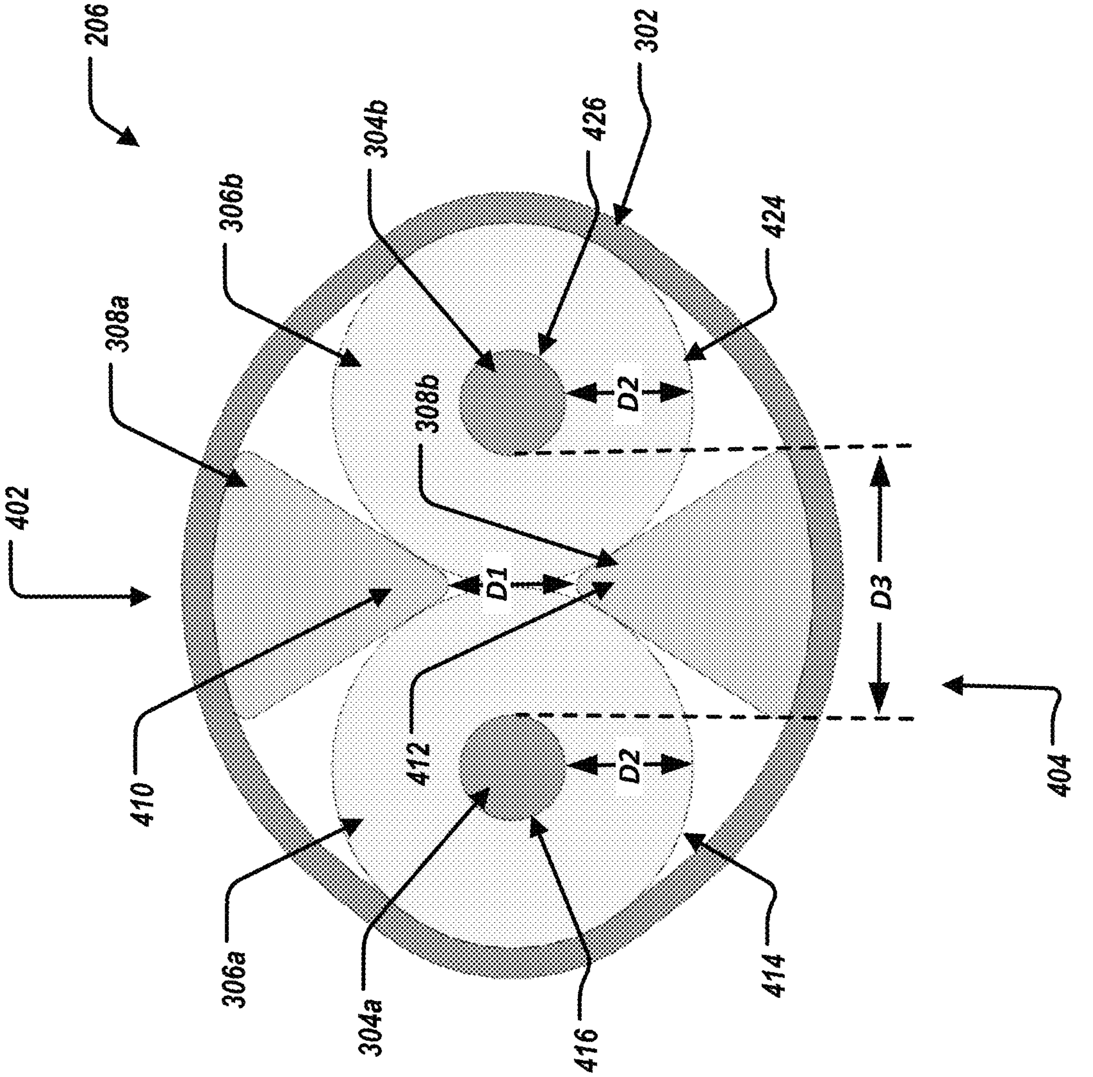
FIG. 5 illustrates a cross-sectional view of the twin-axial cable, in the first state.

FIG. 4A illustrates a perspective view of the twin-axial cable 206 in a first state; and FIG. 4B illustrates a side view of the twin-axial cable 206 in the first state. FIG. 5 a illustrates a cross-sectional view of the twin-axial cable 206, in the first state. The twin-axial cable 206 includes the conductive shield 302, the first conductor 304*a,* the second conductor 304*b,* the first dielectric material 306*a,* the second dielectric material 306*b,* the first wedge 308*a,* and the second wedge 308*b*. In some examples, the conductors 304 can be a differential pair of conductors. In some examples, the conductive shield 302 can be a ground such as a chassis ground of the information handling system 202. In some examples, the conductive shield 302 can be a ground between the components 204.

The first dielectric material 306*a* surrounds the first conductor 304*a.* The second dielectric material 306*b* surrounds the second conductor 304*b.* The conductive shield 302 surrounds the first conductor 304*a,* the second conductor 304*b,* the first dielectric material 306*a,* the second dielectric material 306*b,* the first wedge 308*a,* and the second wedge 308*b*.

The first wedge 308*a* can be positioned at a first region 402 of the twin-axial cable 206. The first wedge 308*a* can be positioned between the first dielectric material 306*a* and the second dielectric material 306*b* at the first region 402 of the twin-axial cable 206. That is, a portion 410 of the first wedge 308*a* can be positioned between the first dielectric material 306*a* and the second dielectric material 306*b* at the first region 402 of the twin-axial cable 206.

The second wedge 308*b* can be positioned at a second region 404 of the twin-axial cable 206, the second region 404 opposite to the first region 402. The second wedge 308*b* can be positioned between the first dielectric material 306*a* and the second dielectric material 306*b* at the second region 404 of the twin-axial cable 206. That is, a portion 412 of the second wedge 308*b* can be positioned between the first dielectric material 306*a* and the second dielectric material 306*b* at the second region 404 of the twin-axial cable 206.

In some examples, the first wedge 308*a* and the second wedge 308*b* are both conductive. In some examples, only one of the first wedge 308*a* and the second wedge 308*b* is conductive, and the other is non-conductive. In some examples, the first wedge 308*a* and the second wedge 308*b* are equilateral triangles. In some examples, the first wedge 308*a* and the second wedge 308*b* include rounded corners. The wedges 3008 can have any shape desired, any type of triangular shape, or any geometry as desired.

To that end, when the twin-axial cable 206 is in a first state, as shown in FIGS. 4A, 4B, 5, the first wedge 308*a* is spaced-apart from the second wedge 308*b* a first distance D1. Further, when the twin-axial cable 206 is in the first state, an outer surface 414 of the first dielectric material 306*a* is spaced-apart from the outer surface 416 of the first conductor 304*a* a second distance D2. The second distance D2 is substantially constant between the outer surface 414 of the first dielectric material 306*a* and the outer surface 416 of the first conductor 304*a* around the first conductor 304*a* when the twin-axial cable 206 is in the first state.

Moreover, when the twin-axial cable 206 is in the first state, an outer surface 424 of the second dielectric material 306*b* is spaced-apart from an outer surface 426 of the second conductor 304*b* the second distance D2. The second distance D2 is substantially constant between the outer surface 424 of the second dielectric material 306*b* and the outer surface 426 of the second conductor 304*b* around the second conductor 304*b* when the twin-axial cable 206 is in the first state. That is, the dielectric materials 306 are in contact with each other when the twin-axial cable 206 is in the first state.

Moreover, when the twin-axial cable 206 is in the first state, the outer surface 416 of the first conductor 304*a* is spaced-apart from the outer surface 426 of the second conductor 304*b* a third distance D3.

To that end, when the twin-axial cable 206 is in the first state, the twin-axial cable 206 can be associated with a first impedance. The first impedance of the twin-axial cable 206 can be based on the second distance D2 and the third distance D3. That is, the first impedance of the twin-axial cable 206 can be based on the distances between the conductors 304 and the respective outer surfaces of the dielectric materials 306, and a distance between the conductors 304 when the twin-axial cable 206 is in the first state.

Figure 6B:
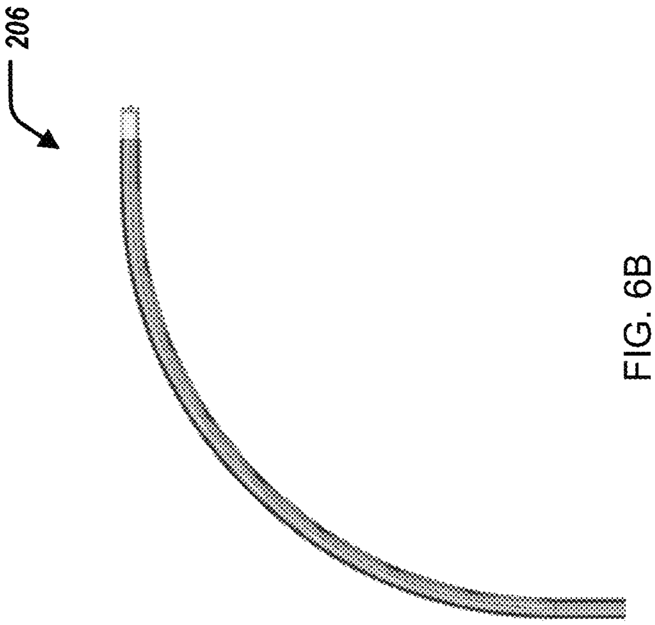
FIG. 6B illustrates a side view of the twin-axial cable, in the second state.
Figure 6A:
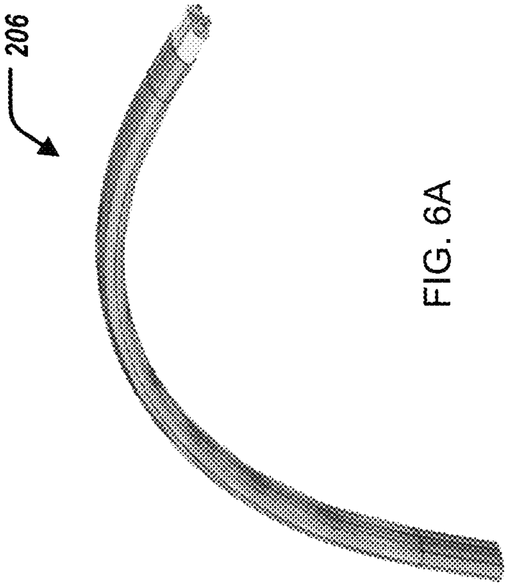
FIG. 6A illustrates a perspective view of the twin-axial cable, in a second state.
Figure 7A:
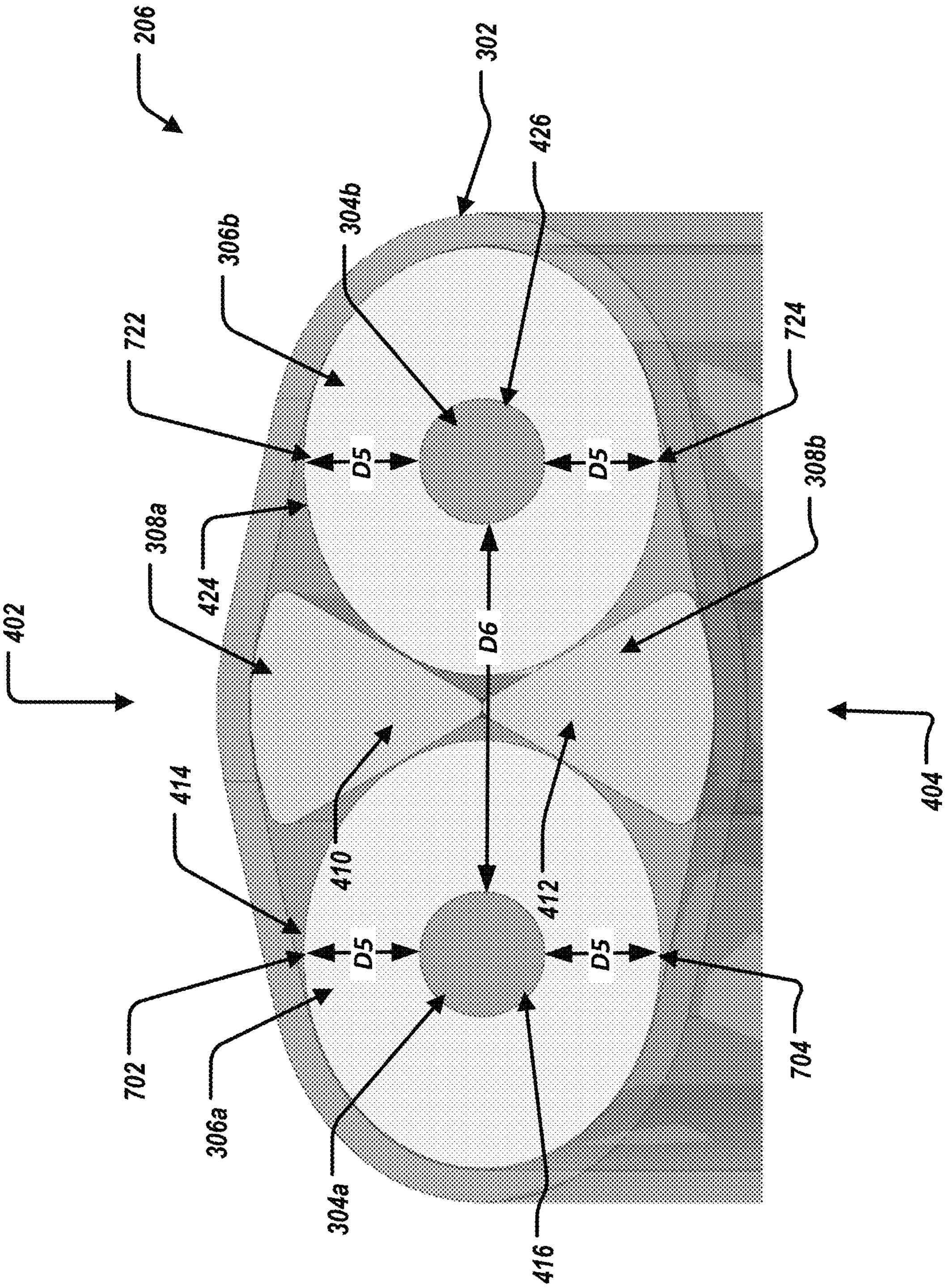
FIGS. 7A, 7B illustrate a cross-sectional view of the twin-axial cable, in the second state.
Figure 7B:
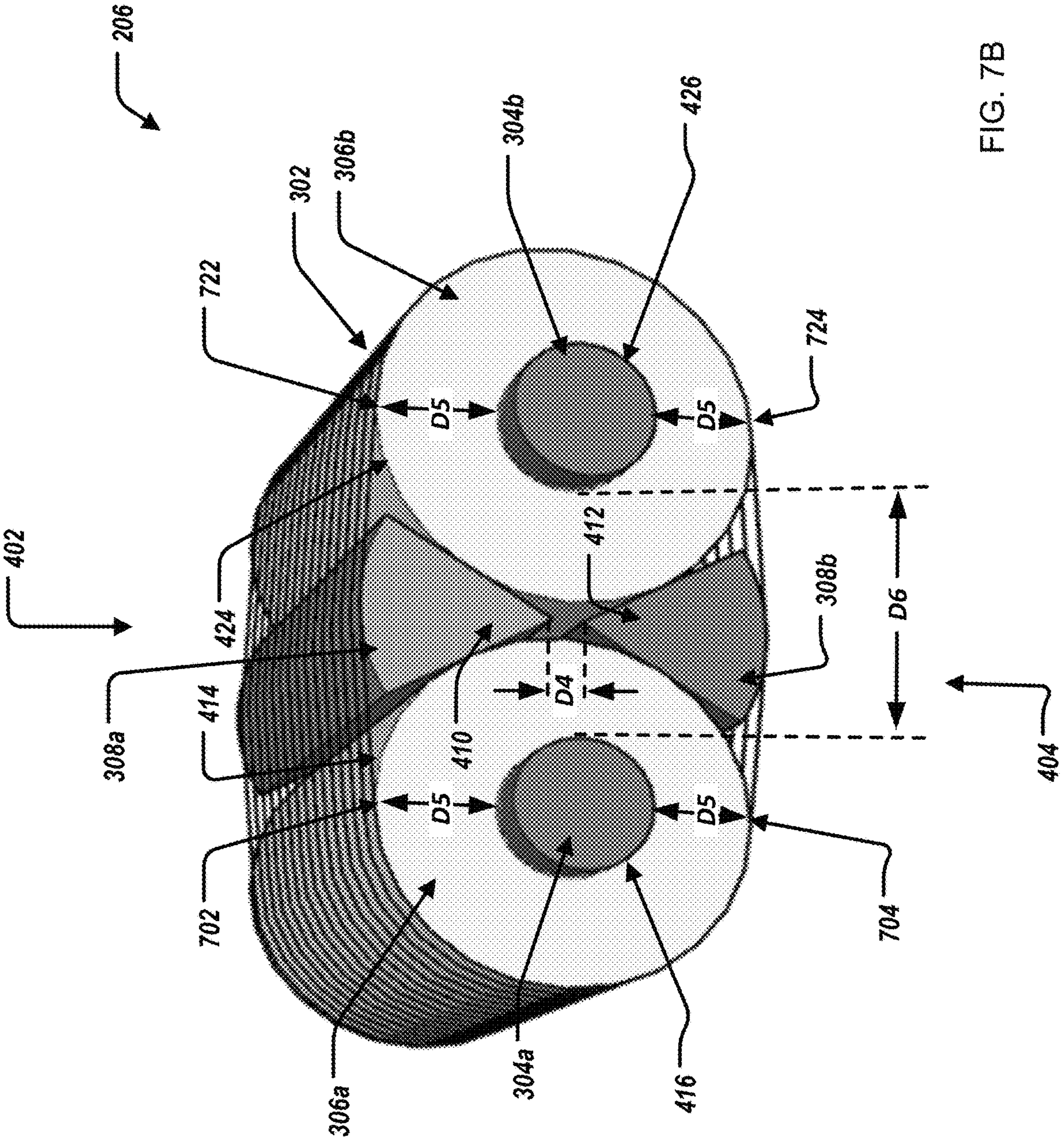

FIG. 6A illustrates a perspective view of the twin-axial cable 206 in a second state; and FIG. 6B illustrates a side view of the twin-axial cable 206 in the second state. FIGS. 7A, 7B illustrate a cross-sectional view of the twin-axial cable 206, in the second state. In some examples, the twin-axial cable 206 can be bent in the second state.

To that end, when the twin-axial cable 206 is in a second state, the first wedge 308*a* is spaced-apart from the second wedge 308*b* a fourth distance D4, as shown in FIG. 7B. In some examples, the fourth distance D4 is less than the first distance D1. In some examples, the fourth distance D4 is zero, or substantially zero, as shown in FIG. 7A. That is, in some examples, the first wedge 308*a* is in contact with (touching) the second wedge 308*b*.

Referring to FIGS. 7A, 7B, further, when the twin-axial cable 206 is in the second state, the outer surface 414 of the first dielectric material 306*a* is spaced-apart from the outer surface 416 of the first conductor 304*a* a fifth distance D5 at a first location 702 and a second location 704. The first location 702 is opposite to the second location 704. The fifth distance D5 is less than the second distance D2, shown in FIG. 5.

Moreover, when the twin-axial cable 206 is in the second state, the outer surface 424 of the second dielectric material 306*b* is spaced-apart from the outer surface 426 of the second conductor 304*b* the fifth distance D5 at a first location 722 and a second location 724. The first location 722 is opposite to the second location 724.

Moreover, when the twin-axial cable 206 is in the second state, the outer surface 416 of the first conductor 304*a* is spaced-apart from the outer surface 426 of the second conductor 304*b* a sixth distance D6. The sixth distance D6 is greater than the third distance D3, shown in FIG. 5.

Specifically, the twin-axial cable 206 can be bent such that the conductive shield 302 compresses (at least) the first dielectric material 306*a* at the first location 702 and the second location 704 and compresses (at least) the second dielectric material 306*b* at the first location 722 and the second location 724. To compensate for an impedance drop of the twin-axial cable 206 when the conductive shield 302 compresses the twin-axial cable 206, concurrently when the conductive shield 302 compresses the dielectric material 306, the conductive shield 302 forces the wedges 308 together to decrease the gap therebetween. That is, the conductive shield 302 forces the wedges 308 together to decreases the distance D1 (as shown in FIG. 5) to the distance D4 (as shown in FIG. 7B) or further such that the wedges 308 are touching (as shown in FIG. 7A). When the distance between the wedges 308 is decreased, the distance between the conductors 304 is increased from the distance D3 (as shown in FIG. 5) to the distance D6 (as shown in FIGS. 7A, 7B). When the distance between the conductors 304 is increased, the impedance of the twin-axial cable 206 is increased, compensating for the drop in impedance when the conductive shield 302 compresses the twin-axial cable 206.

To that end, when the twin-axial cable 206 is in the second state, the twin-axial cable 206 can be associated with a second impedance. The second impedance of the twin-axial cable 206 can be based on the fifth distance D5 and the sixth distance D6. That is, the second impedance of the twin-axial cable 206 can be based on the distances between the conductors 304 and the respective outer surfaces of the dielectric materials 306, and a distance between the conductors 304 when the twin-axial cable 206 is in the second state.

To that end, as the spacing between the conductors 204 increases when in the second state as compared to the first state (increasing from distance D3 to distance D6) and the spacing between the conductors 304 and outer surfaces of respective dielectric materials 306 decreases when in the second state as compared to the first state (decreasing from distance D3 to distance D5), the second impedance of the twin-axial cable 206 in the second state is the same, or substantially the same, as the first impedance of the twin-axial cable 206 in the first state.

Figure 8B:
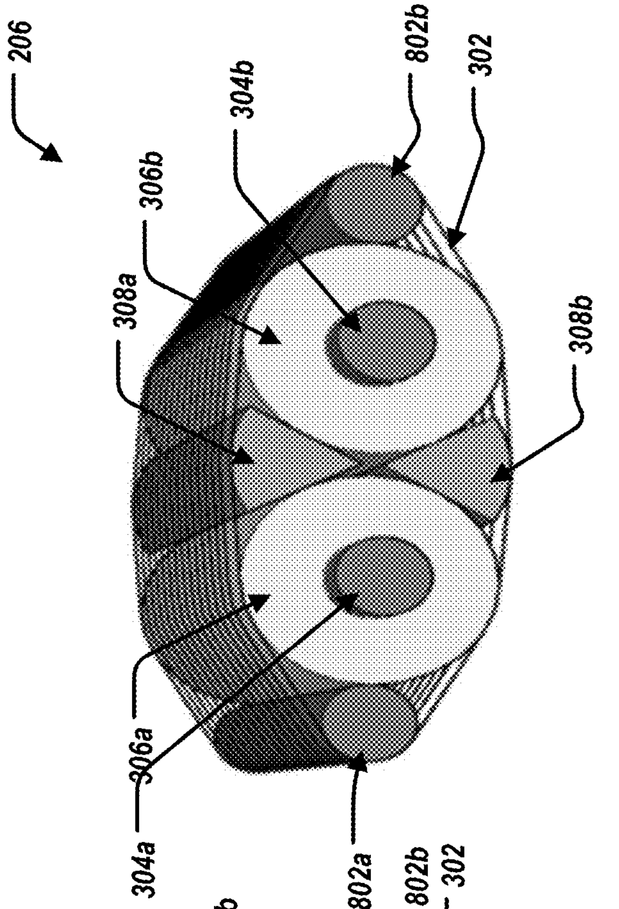
FIG. 8B illustrates a cross-sectional view of the twin-axial cable, in the second state, in the second implementation.
Figure 8A:
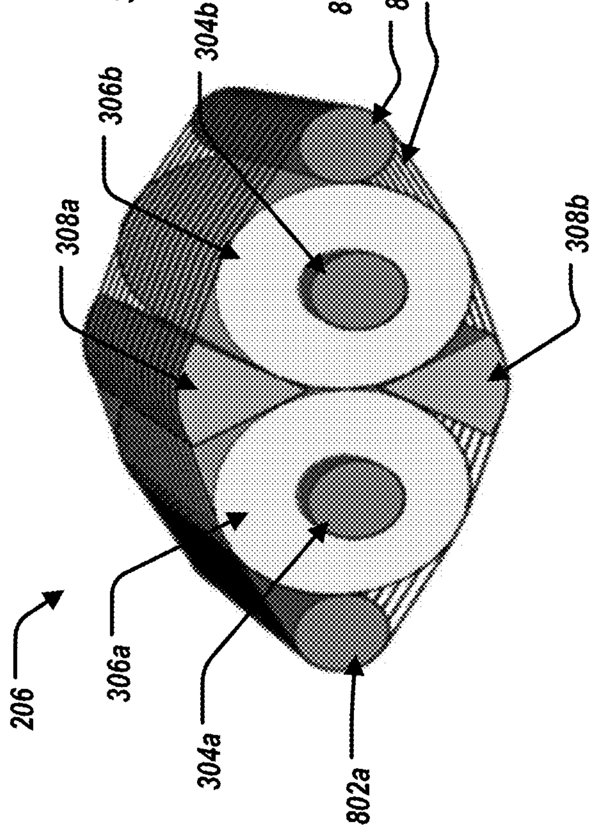
FIG. 8A illustrates a cross-sectional view of the twin-axial cable, in the first state, in a second implementation.

In a further embodiment, as shown in FIGS. 8A, 8B, the twin-axial cable 206 can further include a first drain 802*a* and a second drain 802*b* (collectively referred to as drains 802). In some examples, the twin-axial cable 206 includes only a single drain 802. The conductive shield 302 can further surround the first conductor 304*a,* the second conductor 304*b,* the first dielectric material 306*a,* the second dielectric material 306*b,* the first wedge 308*a,* the second wedge 308*b,* and the drains 802*a,* 802*b*.

Figures 9A, 9B:
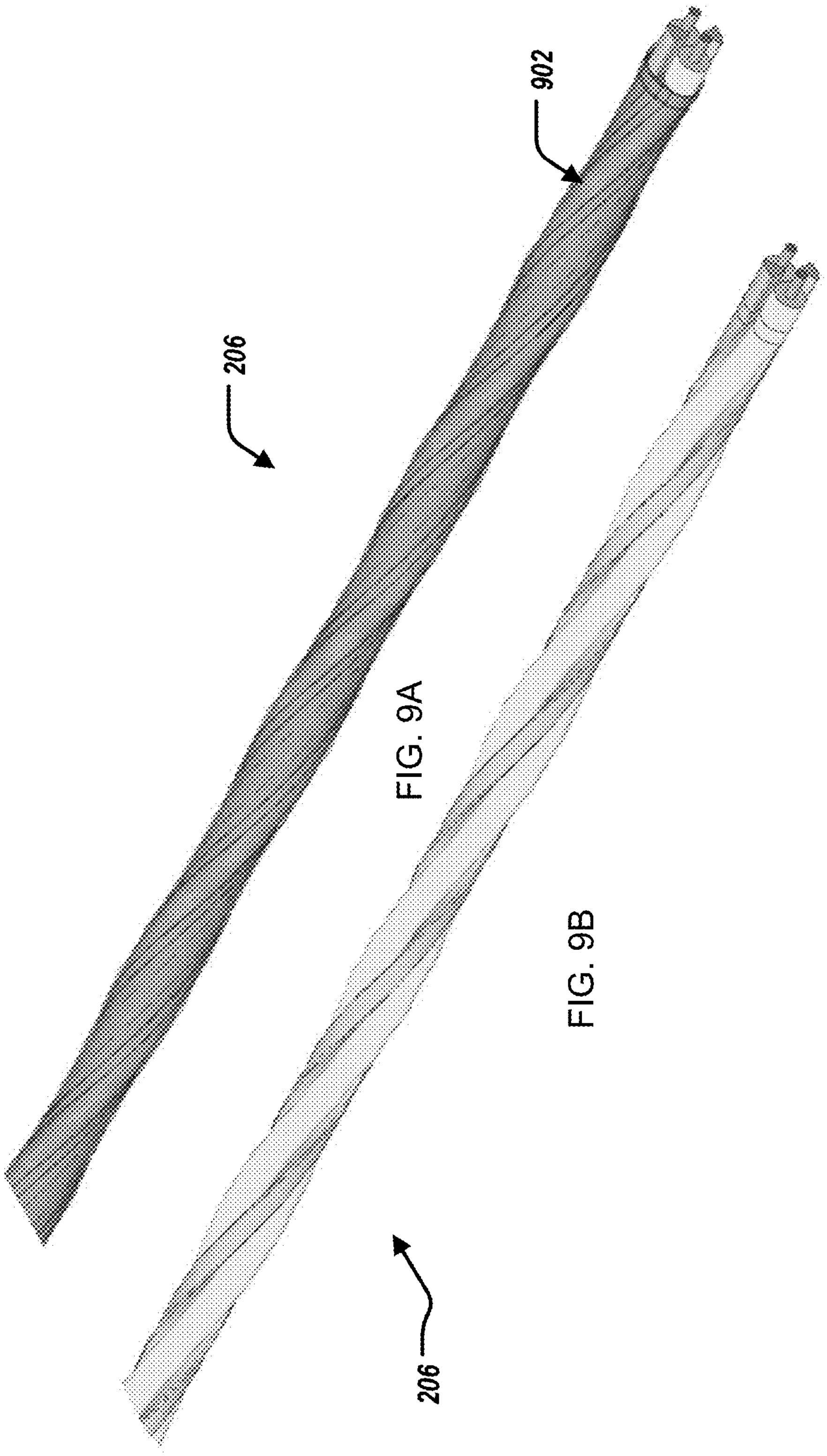
FIG. 9A illustrates a perspective view of the twin-axial cable, in a third implementation.
FIG. 9B illustrates a perspective view of the twin-axial cable, in the third implementation.
Figure 9C:
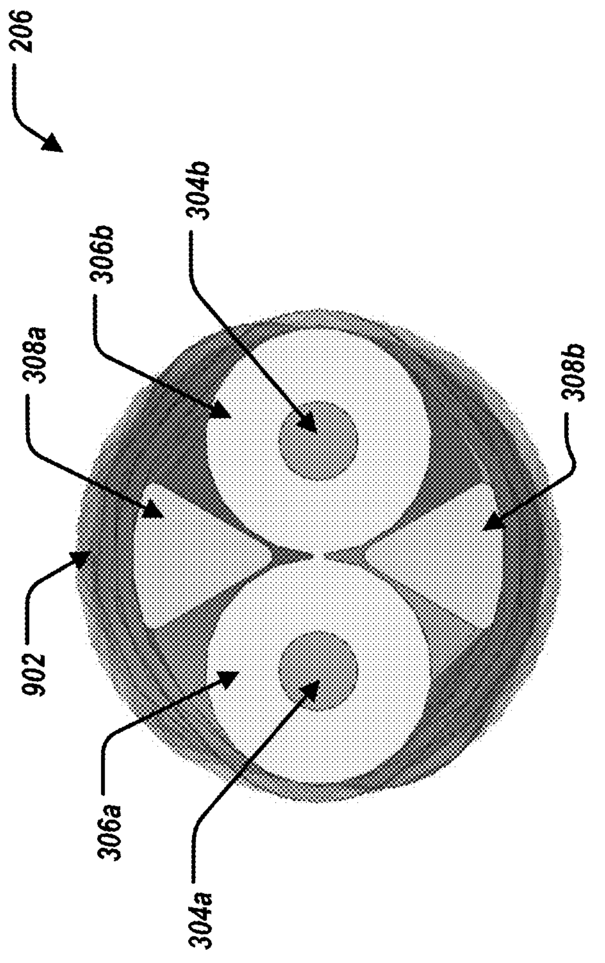
FIG. 9C illustrates a cross-sectional view of the twin-axial cable, in the third implementation.

In a further embodiment, as shown in FIGS. 9A, 9B, 9C, the twin-axial cable 206 can be twisted, or in a corkscrew. In some examples, the twin-axial cable 206 further includes a tape wrap 902.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A twin-axial cable including:

a first conductor;

a first dielectric material surrounding the first conductor;

a second conductor;

a second dielectric material surrounding the second conductor;

a first wedge;

a second wedge positioned opposite to the first wedge; and a conductive shield surrounding the first conductor, the first dielectric material, the second conductor, the second dielectric material, the first wedge, and the second wedge, wherein at least a portion of the first wedge is positioned between the first dielectric material and the second dielectric material at a first region of the twin-axial cable, the first wedge contacting a first portion of the first dielectric material and a first portion of the second dielectric material such that a first vertex of the first wedge is positioned between the first dielectric material and the second dielectric material, wherein at least a portion of the second wedge is positioned between the first dielectric material and the second dielectric material at a second region of the twin-axial cable opposite to the first region of the twin-axial cable, the second wedge contacting a second portion of the first dielectric material and a second portion of the second dielectric material such that a first vertex of the second wedge is positioned between the first dielectric material and the second dielectric material, wherein, in a first state, the first vertex of the first wedge is spaced-apart from the first vertex of the second wedge a first distance such that:

an outer surface of the first dielectric material is spaced-apart from an outer surface of the first conductor a second distance, wherein the second distance is substantially constant between the outer surface of the first dielectric material and the outer surface of the first conductor, an outer surface of the second dielectric material is spaced-apart from an outer surface of the second conductor the second distance, wherein the second distance is substantially constant between the outer surface of the second dielectric material and the outer surface of the second conductor, the outer surface of the first conductor is spaced-apart from the outer surface of the second conductor a third distance, wherein a first impedance of the twin-axial cable is based on the second distance and the third distance, wherein, in a second state, the first vertex of the first wedge is spaced-apart from the first vertex of the second wedge a fourth distance less than the first distance such that:

the outer surface of the first dielectric material is spaced-apart from the outer surface of the first conductor a fifth distance at a first and a second location of the first dielectric material, the first location opposite to the second location, the fifth distance less than the second distance, the outer surface of the second dielectric material is spaced-apart from the outer surface of the second conductor the fifth distance at a third and a fourth location of the second dielectric material, the third location opposite to the fourth location, the outer surface of the first conductor is spaced-apart from the outer surface of the second conductor a sixth distance, wherein the sixth distance is greater than the third distance, wherein a second impedance of the twin-axial cable is based on the fifth distance and the sixth distance.

2. The twin-axial cable of claim 1, wherein the first impedance is substantially the same as the second impedance.

3. The twin-axial cable of claim 1, wherein the first wedge and the second wedge are conductive.

4. The twin-axial cable of claim 1, wherein the first wedge is conductive, and the second wedge is non-conductive.

5. The twin-axial cable of claim 1, wherein the first wedge and the second wedge are equilateral triangles.

6. An information handling system, comprising:

a processor;

memory media storing instructions executable by the processor to perform operations;

a twin-axial cable, including:

a first conductor;

a first dielectric material surrounding the first conductor;

a second conductor;

a second dielectric material surrounding the second conductor;

a first wedge;

a second wedge positioned opposite to the first wedge; and a conductive shield surrounding the first conductor, the first dielectric material, the second conductor, the second dielectric material, the first wedge, and the second wedge, wherein at least a portion of the first wedge is positioned between the first dielectric material and the second dielectric material at a first region of the twin-axial cable, the first wedge contacting a first portion of the first dielectric material and a first portion of the second dielectric material such that a first vertex of the first wedge is positioned between the first dielectric material and the second dielectric material, wherein at least a portion of the second wedge is positioned between the first dielectric material and the second dielectric material at a second region of the twin-axial cable opposite to the first region of the twin-axial cable, the second wedge contacting a second portion of the first dielectric material and a second portion of the second dielectric material such that a first vertex of the second wedge is positioned between the first dielectric material and the second dielectric material, wherein, in a first state, the first vertex of the first wedge is spaced-apart from the first vertex of the second wedge a first distance such that:

an outer surface of the first dielectric material is spaced-apart from an outer surface of the first conductor a second distance, wherein the second distance is substantially constant between the outer surface of the first dielectric material and the outer surface of the first conductor, an outer surface of the second dielectric material is spaced-apart from an outer surface of the second conductor the second distance, wherein the second distance is substantially constant between the outer surface of the second dielectric material and the outer surface of the second conductor, the outer surface of the first conductor is spaced-apart from the outer surface of the second conductor a third distance, wherein a first impedance of the twin-axial cable is based on the second distance and the third distance, wherein, in a second state, the first vertex of the first wedge is spaced-apart from the first vertex of the second wedge a fourth distance less than the first distance such that:

the outer surface of the first dielectric material is spaced-apart from the outer surface of the first conductor a fifth distance at a first and a second location of the first dielectric material, the first location opposite to the second location, the fifth distance less than the second distance, the outer surface of the second dielectric material is spaced-apart from the outer surface of the second conductor the fifth distance at a third and a fourth location of the second dielectric material, the third location opposite to the fourth location, the outer surface of the first conductor is spaced-apart from the outer surface of the second conductor a sixth distance, wherein the sixth distance is greater than the third distance, wherein a second impedance of the twin-axial cable is based on the fifth distance and the sixth distance.

7. The twin-axial cable of claim 6, wherein the first impedance is substantially the same as the second impedance.

8. The twin-axial cable of claim 6, wherein the first wedge and the second wedge are conductive.

9. The twin-axial cable of claim 6, wherein the first wedge is conductive, and the second wedge is non-conductive.

10. The twin-axial cable of claim 6, wherein the first wedge and the second wedge are equilateral triangles.

* * * * *